United States Patent
Cheung et al.

(10) Patent No.: US 7,388,871 B2
(45) Date of Patent: Jun. 17, 2008

(54) METHOD AND SYSTEM FOR CHANGING MESSAGE FILTER COEFFICIENTS DYNAMICALLY

(75) Inventors: Francis Cheung, Del Mar, CA (US); Ut Nguyen, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 643 days.

(21) Appl. No.: 11/015,445

(22) Filed: Dec. 17, 2004

(65) Prior Publication Data
US 2005/0175029 A1 Aug. 11, 2005

Related U.S. Application Data

(60) Provisional application No. 60/542,591, filed on Feb. 5, 2004.

(51) Int. Cl.
*H04L 12/28* (2006.01)
*H04L 12/56* (2006.01)
(52) U.S. Cl. .................... 370/401; 370/389; 370/488; 370/486
(58) Field of Classification Search .......... 370/400, 370/389, 485, 392, 474, 480, 486, 488, 465, 370/464; 375/350, 342, 343; 348/665–667
See application file for complete search history.

(56) References Cited

U.S. PATENT DOCUMENTS

| 6,781,601 | B2* | 8/2004 | Cheung ................. 345/629 |
| 6,798,420 | B1* | 9/2004 | Xie ........................ 345/554 |
| 7,098,958 | B2* | 8/2006 | Wredenhagen et al. ..... 348/452 |
| 2003/0174718 | A1* | 9/2003 | Sampath et al. ............. 370/401 |
| 2004/0190513 | A1* | 9/2004 | Hakkarainen et al. ....... 370/389 |
| 2004/0199559 | A1* | 10/2004 | McAdam et al. ............ 708/322 |
| 2005/0135700 | A1* | 6/2005 | Anderson ................... 382/261 |
| 2007/0030276 | A1* | 2/2007 | MacInnis et al. ........... 345/505 |
| 2007/0201588 | A1* | 8/2007 | Loiseau et al. ............. 375/346 |

* cited by examiner

*Primary Examiner*—Ajit Patel
(74) *Attorney, Agent, or Firm*—McAndrews, Held & Malloy, Ltd.

(57) ABSTRACT

Certain aspects of changing message filter coefficients dynamically in a packetized network system may comprise selecting a filter for filtering data in a first portion of an incoming data stream. At initiation of a new modification process, a determination may be made as to whether the selected filter is in use and if so, data read by the selected filter may be invalidated or otherwise not utilized for its intended purpose. A selected filter may be marked as being in use prior to being updated, indicating that there is no match for the selected filter. Filter coefficients for the selected filter may be updated while the selected filter is marked as being in use. Upon completion of updating the filter, the selected filter may be marked as not being in use.

48 Claims, 4 Drawing Sheets

METHOD AND SYSTEM FOR CHANGING MESSAGE FILTER COEFFICIENTS DYNAMICALLY

CROSS-REFERENCE TO RELATED APPLICATIONS/INCORPORATION BY REFERENCE

This application makes reference to, claims priority to, and claims the benefit of U.S. Provisional Application Ser. No. 60/542,591 filed Feb. 5, 2004.

This application makes also makes reference to:
U.S. application Ser. No. 10/392,468 filed Mar. 19, 2003, which claims priority to U.S. Provisional Application Ser. No. 60/406,707 filed Aug. 29, 2002;
U.S. application Ser. No. 10/392,471 filed Mar. 19, 2003, which claims priority to U.S. Provisional Application Ser. No. 60/406,707 filed Aug. 29, 2002; and
U.S. application Ser. No. 10/391,848 filed Mar. 19, 2003, which claims priority to U.S. Provisional Application Ser. No. 60/406,707 filed Aug. 29, 2002;

The above stated applications are hereby incorporated herein by reference in their entirety.

FIELD OF THE INVENTION

Certain embodiments of the invention relate generally to the processing of MPEG packets. More specifically, certain embodiments of the invention relate to a method and system for changing message filter coefficients dynamically.

BACKGROUND OF THE INVENTION

The introduction of broadband networks, access devices such as set-top boxes, and media such as DVD disks recorded with digitally compressed audio, video and data signals, for example, which utilize motion Picture Expert Group (MPEG) compression protocols, may provide sound and picture quality that is virtually indistinguishable from the original material. One of the commonly-used MPEG protocols called MPEG-2, provides the necessary protocols and infrastructure that may be used for transferring digitally compressed audio, video and data signals. A detailed description of the MPEG 2 standard is published as ISO/IEC Standard 13818.

An MPEG program may contain a plurality of data streams. These may include the elementary stream (ES), a packetized elementary stream (PES), a transport stream (TS) and a program specific information stream. An MPEG encoder typically creates the ESs by utilizing one or more of analog video and audio content. The MPEG encoder may be configured to apply MPEG compression algorithms to the source content, which may result in an individual compressed ES for each audio and video stream. This encoded and compressed data stream may be decoded in a set-top box and viewed on a TV. Factors such as a bit rate of the encoded stream, quality of the original source content and encoder algorithm may typically determine the quality of the output signal. Notably, the type of encoding may determine whether another system will be able to decode and interpret a received MPEG data stream. In this regard, the other system may be a legacy or disparate system.

In a typical MPEG data stream, the length of individual ESs may be equivalent to the length of the program. Each ES may be contained in a plurality of variable-length packets called a PES. The PES may include a header that may precede one or more payload bytes. The header may include information pertaining to the encoding process required by the MPEG decoder to decompress and decode a received ES. Each individual ES may have a corresponding PES and any encoded audio and video information may still reside in separate PESs. Notably, the PES may be viewed primarily as a logical construct and is not intended to be utilized for data interchange, transport, and interoperability. Notwithstanding, the PES may be utilized for conversion between transport streams (TSs) and program information streams (PSs).

The TS and PS may be formed by multiplexing a plurality of PES packets. The TS may include a plurality of additional packets that may contain tables, which may be necessary for de-multiplexing the TS. The tables may be collectively called program specific information (PSI). To maintain synchronization and timing, null packets may also be inserted to fill the intervals between information-bearing packets. Timing information for an associated program may be carried by specific packets. One type of timing information may be called the program clock reference (PCR). The PCR may be located in one of the optional header fields of the TS packet. During operation, the PCR may permit the decoder to synchronize its clock to the same frequency as that of the original encoder's clock frequency. TS packets may have a fixed length of 188 bytes, which may include a header having a minimum size of 4 bytes and a maximum payload of 184 bytes.

FIG. 1 is a diagram of the structure for an exemplary MPEG transport stream 100. Referring to FIG. 1, TS 100 may include a header 102 and payload 104. Header 102 may include the following fields: synchronization (SYNC) 106, transport error indicator 108, payload unit start indicator 110, transport priority 112, packet ID (PID) 114, transport scrambling control 116, adaptation field control 118, continuity counter 120, adaptation field 122, and a plurality of PES, namely PES1 124, PES2 126, . . . , PESn 130. The adaptation field 118 may further include the following fields: adaptation field length 132, discontinuity indicator 134, random access indicator 136, PES priority 138, flags 140, optional fields 142 and stuffing bytes 144. The optional fields 142 may further include the following: program clock reference (PCR) 146, OPCR 148, a splice countdown 150, private data length 152, adaptation field extension length 154, flags 156 and optional field 158.

The TS 100 may include variable length PES that may be divided into fixed length packets for use by a transmission system. In this regard, the information added by the TS is additional to the information contained in the headers of the PESs. SYNC byte 106 may be used to delineate the beginning and ending of TS packet 100. The transport error indicator 108 may indicate when there is an error in a packet or block. This may be particularly useful for error block testing. PID 114 may be a unique identifier that may identify every video and audio stream. Additionally, each PSI table may have a unique PID 114. The PID 114 may be utilized for identifying a channel and may include any information required for locating, identifying and reconstructing programs. Some PIDs are reserved for specific uses by the MPEG protocol. PID values may be stored in PSI tables. In order to ensure that all the audio, video and data for a program are properly decoded, it may be critical to ensure that the PIDs are correctly assigned and that the PSI tables correspond with their associated audio and video streams.

PCR 146 may have 42 bits, 9 bits of which may be incremented at 27 MHz and 33 bits that may be incremented at 90 kHz upon rollover of the 9 bits. The bits in PCR 146 may provide program clock recovery information that may be utilized for synchronization. PCR 146 may be used to provide a clock recovery mechanism for MPEG programs. A 27 MHz system time clock (STC) signal may typically be used for encoding MPEG signals. Decoding of the signal requires a clock that may be locked to the encoder's STC of 27 MHz. Notably, the PCR 146 may be utilized by the decoder to regenerate a local clock signal that is locked to the STC. Whenever a program is placed in the transport stream, a 27 MHz time stamp may be inserted into the PCR 146. When the signal is received by a decoder, the decoder may compare the value in the PCR 146 with the frequency of its local voltage controlled oscillator (VCO) and adjust the VCO to ensure that the VCO is locked to the frequency specified by the PCR 146. To ensure accuracy, the PCR 146 may be updated with the STC every about 100 ms.

The continuity counter (CC) 120 may be used to determine when packets are lost or repeated. It may include a 4-bit field, which may be repeatedly incremented from zero to 15 for each PID. Discontinuity counter 134 may permit a decoder to handle discontinuities in the transport stream. Discontinuity counter 134 may indicate a time base such as the PCR 146 and continuity counter 120 discontinuities. Random access indicator 136 may be configured to indicate whether the next PES packet in the PID stream contains a video-sequence header or the first byte of an audio frame. Splice countdown 150 may be configured to indicate the number packets of the same PID number to a splice point occurring at the start of PES packets.

Two or more MPEG TSs may be multiplexed to form a multi-program TS. In a case where the TC may include a single MPEG TS, the output of the multiplexer may be called a single program TS (SPTS). Furthermore, a number of SPTSs may be multiplexed to create a multi-program TS. In some cases, the program may include one or more ESs that may have a similar time reference. This may occur, for example, in a movie that has video and its corresponding audio content.

PSI may include a set of tables that may be part of a TS. The tables in the PSI may be required while de-multiplexing the TS and for matching PIDs to their corresponding programs. Once the PIDs are matched to their corresponding programs, the TS may be decoded by assembling and decompressing program contents. Typically, in order to determine which audio and video PIDs contain the corresponding content for a particular program, a program map table (PMT) may be decoded. Each program may have its own PMT bearing a unique PID value. The PAT may be decoded in order to determine which PID contains the desired program's PMT. The PAT may function as the master PSI table with PID value which may always be equal to zero (0). In a case where the PAT cannot be found and decoded in the TS, no programs may be available for presentation.

The PSI table may be refreshed periodically at a rate that is fast enough to allow a set-top box to go through program recovery and decompression processes. This may be necessary to ensure real-time user interaction. The PSI may also be used to determine the accuracy and consistency of PSI contents. Notwithstanding, during programs changes or modification of multiplexer provisioning, there may be packets which have a PID value present in the TS, but have no corresponding reference in the PSI. Additionally, the PSI may have references to one or more packets in the PID that are not present in the TS.

In existing MPEG compliant systems, audio/video services may be carried using some or all of the 188 bytes of the packet, called transport packets. Multiple services may be differentiated using a packet identifier (PID) contained in a packet header called the transport packet header. Transport packets from various services may be multiplexed and transmitted on the same physical medium. Exemplary media may include, copper, coaxial cable, wireless, optical and any combination thereof. On the receiver side transport packets may be de-multiplexed and data may be separated for each service. For example, audio packets may be separately de-multiplexed from video packets.

Transport packets may include three fields, namely a 4-byte header, an optional adaptation field and a packet payload. The packet payload may not be altered by multiplexing or transmitting equipment, except during processing which may include data encryption and decryption. In general, encryption may be done once within a typical MPEG processing system. Notwithstanding, some fields of the adaptation field may be changed by multiplexing, for example. Typically, packet order within a PID channel may be maintained from an MPEG encoder to an MPEG receiver but packet order among multiple PID streams may not guaranteed by during transmission by any transmitting equipment. In cases where co-relation of packets from different PIDs may be required, packet position in a stream cannot be utilized since packet order among multiple PID channels may be altered.

Instead of processing an entire transport stream, it may be more efficient to eliminate those portions of the transport steam which are not of interest and concentrate the processing resources on processing those portions of the transport stream that contains pertinent data. In this regard, pertinent data in a transport steam may be filtered using a PSI filter. The filter may be updated on order to processing varying types of pertinent data. However, in certain instances, while a filter is being updated, portions of the filter may still be filtering data. Accordingly, erroneous data may be filtered as pertinent data resulting in data errors. To prevent these kinds of errors, the system may be temporarily halted while a filter is being updated. However, this would be inefficient Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

Certain embodiments of the invention may be found in a method and system for changing message filter coefficients dynamically in a packetized network system. Aspects of the method may comprise selecting a filter for filtering data in a first portion of an incoming data stream. At initiation of a new modification process, a determination may be made as to whether the selected filter is in use and if the selected filter is in use, data read by the selected filter may be invalidated or otherwise not utilized for its intended purpose. A selected filter may be marked as being in use, prior to being updated and if the selected filter is in use, indicating that there is no match for the selected filter. Filter coefficients for the selected filter may be updated while the selected filter is marked as being in use. Upon completion of updating the filter, the selected filter may be marked as not being in use. Whenever a selected filter is declared as a newly declared valid filter, the newly declared valid filter may be utilized at the beginning of a new message in the incoming data stream.

In instances where the selected filter is in use, corresponding data filtered or handled by the selected filter may be discarded. Data in the incoming data stream may be parsed prior to being filtered by the selected filter. A selected filter may be dynamically configured in real-time based on data that is stored in at least one filter configuration table. If a first selected filter is marked as being in use or being updated, a second filter which is not marked as being in use may be utilized to filter at least a second portion of the incoming data stream. In this regard, the updating of a first filter does not prevent use of a second or other filters. Whenever it is determined that a change in status of the selected filter occurs, an indication may be utilized to show this change of status Another embodiment of the invention may provide a machine-readable storage, having stored thereon, a computer program having at least one code section executable by a machine, thereby causing the machine to perform the steps as described above for changing message filter coefficients dynamically in a packetized network system.

Aspects of the method may comprise a processor that selects a filter for filtering data in a first portion of an incoming data stream. The processor may be a host CPU. At initiation of a new modification process, the processor may determine whether the selected filter is in use and if the selected filter is in use, data read by the selected filter may be invalidated or otherwise not utilized for its intended purpose by the processor. A selected filter may be marked by the processor as being in use prior to being updated and if the selected filter is in use, the processor may indicate that there is no match for the selected filter. Filter coefficients for the selected filter may be updated by the processor while the selected filter is marked as being in use. Upon completion of updating the filter, the selected filter may be marked by the processor as not being in use. Whenever a selected filter is declared as a newly declared valid filter, the processor may utilize the newly declared valid filter at the beginning of a new message in the incoming data stream.

In instances where the selected filter is in use, corresponding data filtered or handled by the selected filter may be discarded by the processor. A PSI parser may be utilized to parse data in the incoming data stream prior to the data being filtered by the selected filter. One or more configuration tables may comprise data that may be utilized to dynamically configure a selected filter in real-time. If a first selected filter is marked as being in use or being updated, the processor may utilize a second filter which is not marked as being in use to filter at least a second portion of the incoming data stream. In this regard, the updating of a first filter by the processor does not prevent other filters form filtering valid data. Whenever the processor determines that a change in status of the selected filter occurs, the processor may generate an indication which shows this change of status These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for changing message filter coefficients dynamically in a packetized network system. A filter may be selected to filter data in a first portion of an incoming data stream. Whenever a filter is being updated, it is marked as being in use and any resulting data filtered by this filter is discarded. At initiation of a new modification process, a filter is checked to determine whether it is marked as being in use. If the selected filter is in use, data read by the selected filter may be invalidated. Filter coefficients for the selected filter may be updated while the selected filter is marked as being in use and once the coefficients have been updated, the selected filter may be marked as not being in use. Any resulting data that is filtered while the filter is marked as not being in use may be valid. Since only the selected filter is marked as being in use, other filters that are marked as not being in use may validly generate filtered data.

Figure 1:
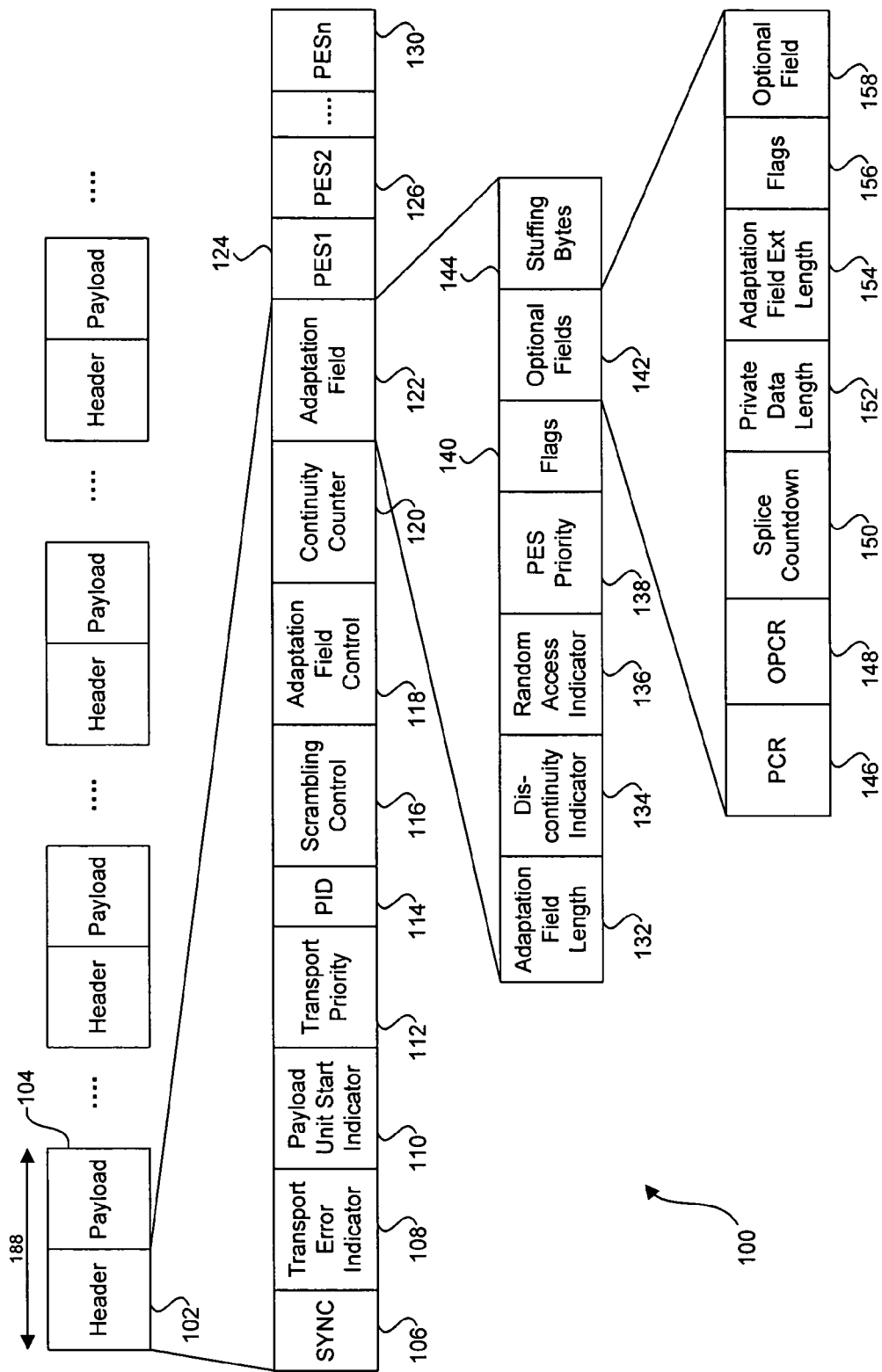
FIG. 1 is a diagram of the structure for an exemplary MPEG transport stream 100.
Figure 1A:
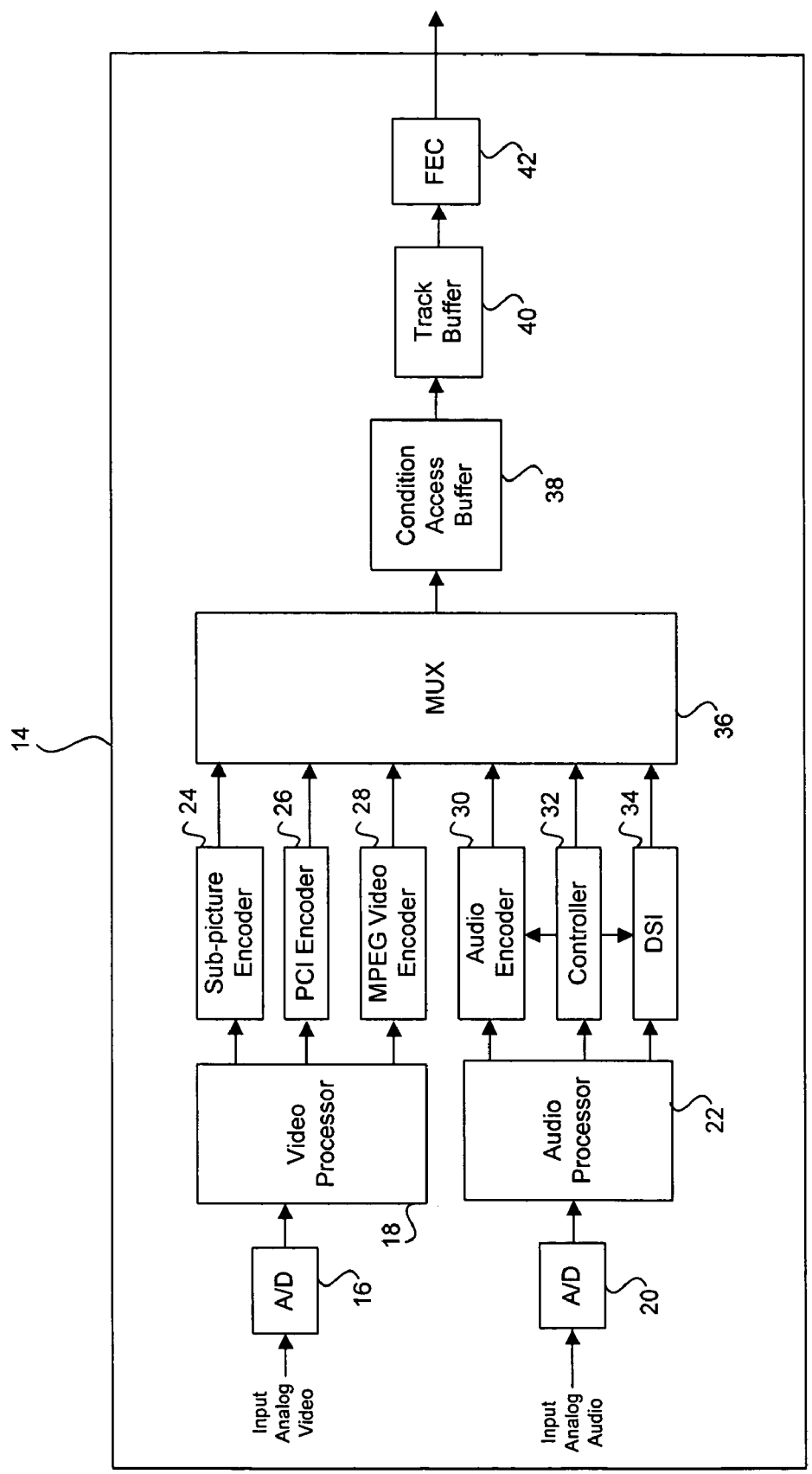
FIG. 1A is a block diagram of an exemplary MPEG encoding system that may be utilized in connection with an embodiment of the invention.

FIG. 1A is a block diagram of an exemplary MPEG encoding system 14 that may be utilized in connection with an embodiment of the invention. Referring to FIG. 1A, an analog input signal may be converted to digital format by A/D converter 16. An output signal from the A/D converter 16 may be communicated to video processor 18 for processing. After the video processor 18 processes the signal, the output signal generated from the video processor 18 may be sent to a sub-picture encoder 24 for processing. A presentation control information (PCI) encoder 26 may be configured to encode PCI data for the video signal processed by video processor 18. The output signal generated from the video processor 18 may also be received and processed by an MPEG video encoder 28 which may be configured to format the video signal in MPEG format.

An analog input audio signal may be converted to digital format by A/D converter 20. An output signal from the A/D converter 20 may be communicated to audio processor 22 for processing. After the audio processor 22 processes the signal, the output signal generated from the audio processor 22 may be sent to an audio encoder 30 to be encoded in a suitable format. A data search information (DSI) encoder 34 may be configured to encode indexing and search data for the video signal processed by audio processor 22. The outputs from the sub-picture encoder 24, PCI encoder 26, MPEG video encoder 28, audio encoder 30 and DSI encoder 34 may be multiplexed into a single data stream, by multiplexer 36. A controller 32 may be configured to control the operations of audio encoder 30, DSI encoder 34 and multiplexer (MUX) 36. The output of the MUX 36 may include a single steam, which may contain various kinds of PES. The PES may include, audio, video, PCI, DSI and sub-picture information.

The MPEG encoding system 14 may also include a conditional access buffer 38 that may be configured to controls propagation of the packets through MUX 36. A track buffer 40 may be used to buffer and assemble data packets for further processing. Finally, the assembled packets may be encoded with a forward error correction algorithm within the forward error correction block (FEC) 42 for transmission over a channel. The output of the FEC block 42 may be an MPEG formatted digital audio/video signal.

Figure 1B:
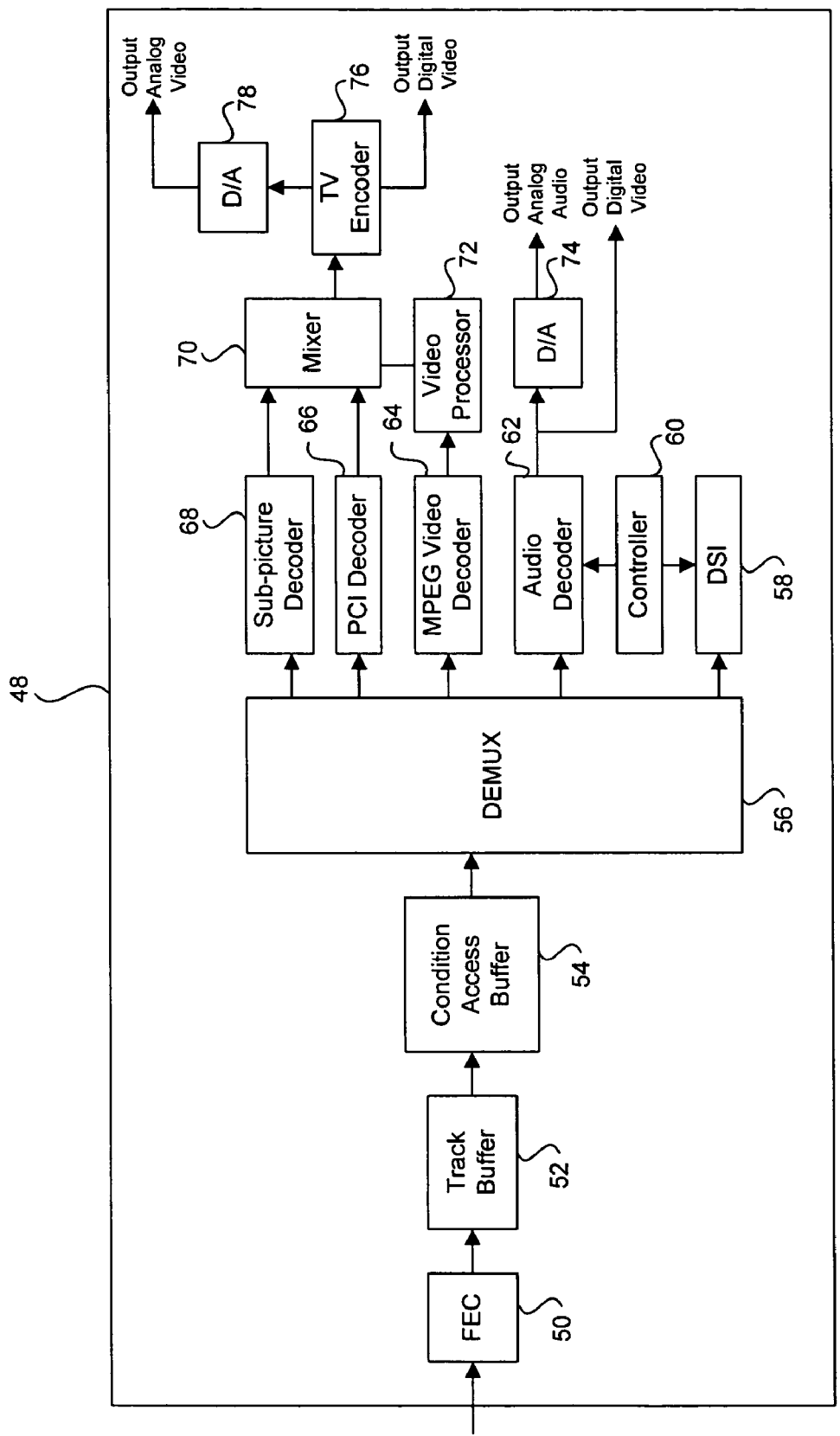
FIG. 1B is a block diagram of an exemplary MPEG decoding system that may be utilized in connection with an embodiment of the invention.

FIG. 1B is a block diagram of an exemplary MPEG decoding system 48 that may be utilized in connection with an embodiment of the invention. MPEG decoding system 48 may be, for example, a set-top box. Referring to FIG. 1B, MPEG decoding system 48 may include a forward error correction processing block 50 and a track buffer 52. The track buffer 52 may be used to buffer and assemble data packets for further processing. The packets may be processed by a conditional access circuit 54 that may be configured to control propagation of the packets through de-multiplexer (DEMUX) 56 and into respective video and audio processing paths. The output of the DEMUX 56 may include various kinds of packetized elementary streams (PES), including audio, video, presentation control information (PCI), sub-picture information, and data search information (DSI) streams. The de-multiplexed PCI in the PES may be buffered prior to being decoded by PCI decoder 66. The method and system for changing message filter coefficients dynamically in a packetized network system may be employed in the exemplary MPEG decoding system 48, for example.

The sub-picture information in the PES may be buffered and decoded by sub-picture decoder 68. The de-multiplexed video stream in the PES may be decoded by MPEG video decoder 64. Video processor 72 may be configured to process the output from the MPEG video decoder 64. Video processor 72 may be a microprocessor or an integrated circuit (IC). Subsequent to processing of the MPEG video, mixer 70 may combine the outputs of the PCI decoder 66, the video processor 64 and the sub-picture decoder 68 to form a composite video signal. The output of mixer 70 may thereafter be encoded in a conventional television signal format such as PAL, SECAM, or NTSC by the TV encoder 76. The output of the TV encoder 76 may be a digital video signal. However, D/A converter 78 may convert this digital video output signal to an analog video output signal.

The audio portion of the PES may be buffered and decoded by audio decoder 62. The output of the audio decoder 62 may be a digital audio signal. The audio D/A 74 may process digital audio received from the audio decoder 62 and produce an analog audio output signal. Audio decoder 62 may include a frame buffer sufficient for temporarily storing audio frames prior to decoding. Controller 60 may control the operation of audio decoder 62 and DSI 58. Controller 60 may be configured to utilize DMA to access to data in track buffer 52 or any other associated memory (not shown).

Program specific information (PSI) comprises MPEG data identifying specific portions of a transport stream belonging to a particular program. Program specific information may be communicated via one or more PSI tables. These PSI tables may comprise a program association table (PAT), a program map table (PMT), a conditional access table (CAT) and a network information table (NIT). The conditional access table may be utilized to identify those PID values in the transport packets which bear entitlement management messages (EMMs). The network information table may be utilized to map information such as channel frequencies and transponder numbers.

While the program association table, and program map table may be required by MPEG-2, the conditional access table and the network information table may be optional tables. In certain applications, all the tables may be required. Entry to the program specific information (PSI) tables may be provided by the program association table, the latter of which is carried in packets bearing a PID of 0 (packet ID=0). Each program may be assigned a program number and for each program number that is assigned, the program association table lists the PID associated with packets containing the corresponding program's program map table (PMT). The PMT generally comprises a listing of the PIDs for packets having various components for a particular program such as audio, video, and program clock reference (PCR). The program association table may also comprise program IDs for one or more network information tables. The NIT may be utilized for identification purposes and may be utilized to map information such as transponder numbers and channel frequencies for programs. Packets bearing a PID of 1 (packet ID=1) may be utilized to carry conditional access tables. The PIDs for entitlement management messages (EMMs), may comprise authorization level information, which may be stored in the conditional access tables located in conditional access buffers.

During decoding, an MPEG decoder may be adapted to read a program access table in order to locate a desired program. Once the desired program is located in the program access table, packets bearing the desired program map table may be demultiplexed. The program map table may then be read to identify those packets that bear the program IDs specified in the program map table. Once the program IDs are read, the corresponding packets may then be demultiplexed in order to generate the associated elemental streams.

A program specific information (PSI) filter is a byte filter that may be utilized to process PSI messages that may be carried in a payload section of transport packets. PSI messages may have different lengths and may span multiple transport packets. For example, PSI messages may be up to about 4000 bytes in length and may carry information such as the decryption keys utilized to decrypt certain channels, channel contents or even user download data. PSI packets may be reapportioned into several smaller packets so that they may fit into transport packets. The transport packets may themselves be interleaved. In other words, multiple streams of transport packets each with a different packet ID (PID) may be mixed together into a single stream of packets, wherein each packet adjacent in time may have a different PID. The PSI messages comprise specific fields which identify information such as destinations and links. Given the length and quantity of information that is located, to expedite processing, a receiver may choose only to look at specific fields. In this regard, byte filters are provided to mask out unnecessary information and at the same time providing access only to information that may be deemed pertinent. The filter may provide access to pertinent information by comparing specific bytes in the PSI message with specific programmed bytes that are desired. For example, if a filter is 16 bytes long, the filter may be adapted to look at the first 16 bytes of a PSI message.

The byte filters may each be several bytes in length. Since the filter coefficients may be extremely long, it may not be possible to update the filter coefficients in a single clock cycle. For example, if a byte filter is 128 bytes and a 16-bit microprocessor is being utilized, then eight (8) write cycles may be required for updating a filter. During the period required for executing the write cycles, any number of circumstances may have occurred between the writes because the writes are not guaranteed to occur back-to-back. In other words, there is no guarantee that the writes will occur consecutively since the microprocessor may be sharing its processing resources among a plurality of tasks. Hence, in one instant the microprocessor may be looking at the coefficients for the current 8 bytes of a first PSI filter and in the next instant, the microprocessor may be looking at the coefficients for another 8 bytes of a second PSI filter for which updating was incomplete. Accordingly, if a filter is utilized while it is being updated, this may result in erroneous data being filtered.

The contents of any particular message in the incoming data stream, which the PSI filter attempts to match may be in different transport packets, and as a result, there may be an unknown and variable amount of time or number of other transport packets in between. Since the update of all the coefficients for each filter may not be instantaneous, there may be instances when the coefficients are only partially updated while filtering is active. In this regard, erroneous results may be produced by a PSI filter while it is being updated. Furthermore, since there may be many different messages that are carried by the same PID stream, and multiple filters may be utilized to filter the different messages, it may not be desirable to have the update of a filter halt the processing of any of the other filters. To prevent a partially updated filter from producing erroneous matches, a particular PSI filter may be timely disabled, updated while disabled, and then re-enabled after being updated. The disabling, updating and re-enabling of the PSI filter may occur without affecting the ability of other PSI filters that are not in use to filter valid payload PSI data.

In an aspect of the invention, a mechanism is provided to prevent erroneous filtering results from being produced. In this regard, at the beginning of a filter update operation, a filter that is being utilized may be marked or tagged once a modification is initiated. Accordingly, when a filter is selected, a determination is made as to whether the filter is in use. If the filter is in use as indicated by being marked or tagged, any data read may immediately be declared invalid and the result is a no-match for that filter. Since multiple filters may be utilized for the same messages, matches from other filters may still occur. However, for this filter, any message that is being processed during that period will not have a match by this filter. The filter coefficients for a filter may be updated, for example, with several operations and after a successful update, a filter may then be declared valid. However, while a filter is being updated, it is barred from being used. In another aspect of the invention, filters that are newly declared valid may be utilized at the beginning of a new message. In this case, the associated hardware may still possess all the necessary information and logic so that it may not require software to monitor the contents of the transport packets that are being processed.

Figure 2:
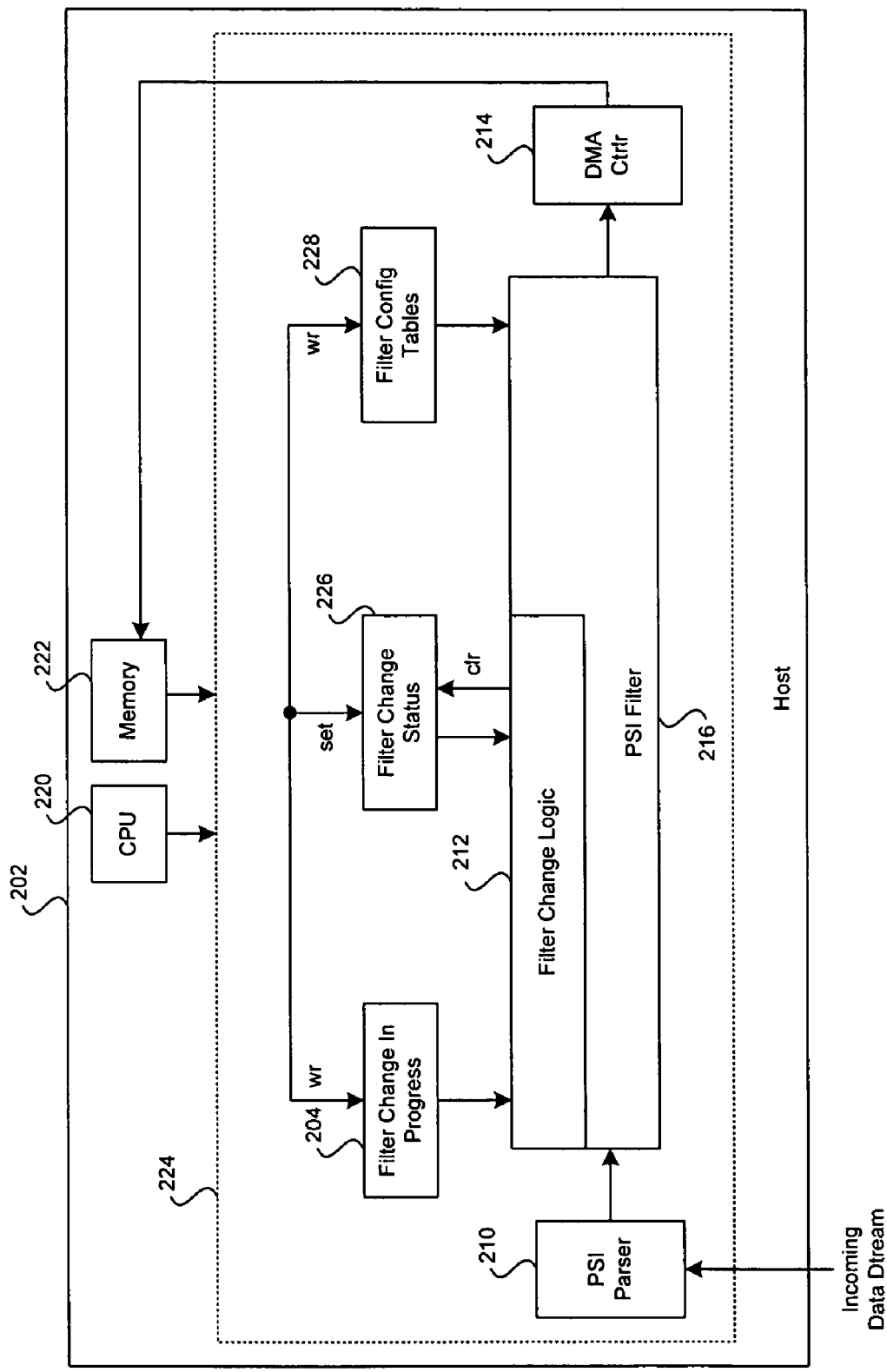
FIG. 2 is a block diagram of an exemplary system that may be utilized for dynamically changing message filter coefficients in accordance with an embodiment of the invention

FIG. 2 is a block diagram of an exemplary system 224 that may be utilized for dynamically changing message filter coefficients in accordance with an embodiment of the invention. Referring to FIG. 2, there is shown a host 202, a filter change in progress block 204, a filter change status block 206, a filter configuration tables block 228, a PSI filter block 216, a PSI parser block 210 and a direct memory access (DMA) controller block 214. The PSI filter block 216 may comprise a filter change logic block 212, which may be coupled to the filter change in progress block 204 and the filter change status block 206.

The host 202 may comprise a microprocessor or CPU 220 and a memory 222. The host 202, along with one or more applications, may be utilized to control logic and/or circuitry of the exemplary system for dynamically changing message filter coefficients of the PSI filter block 216.

The filter change in progress process block 204 may comprise suitable logic, circuitry and/or code that may be adapted to identify or mark when a filter is being updated. In one embodiment of the invention, the filter change in progress process block 204 may be implemented as a software application that is configured to track filters while they are being updated. In this regard, while a filter is being updated, the filter change in progress process block 204 may mark the filter as being is use. Accordingly, any data which is handled or filtered while the filter is marked as being in use may be discarded or otherwise ignored.

The filter change status block 206 may comprise suitable logic, circuitry and/or code that may be adapted to track the status of the changes to a PSI filter. In one aspect of the invention, the filter change status block may be dynamically updated in real-time. In another embodiment of the invention, the filter change status block 206 may utilize, for example, one or more flags which may be utilized to indicate when a filter is being updated and when the updating process is completed. In one embodiment of the invention, the filter change status block 206 may be implemented as a software application that is configured to dynamically track the status of the filters. In this regard, filter change status block 206 may possess knowledge of which filter may be validly filtering data and which filter may not be validly filtering data. This information may be communicated to the host processor 220.

The filter configuration table block 228 may comprise configuration data that may be utilized to configure the PSI filters, which are utilized to examine pertinent data in the PSI packets. The configuration table block 228 may be stored in memory from which PSI filter coefficients may be retrieved and/or updated.

The filter change logic block 212 may comprise suitable logic, circuitry and/or code that may be interfaced to the PSI filter block 216, the filter change in progress process block 204 and the filter change status process block 206. The filter change logic block 212 may be adapted to utilize a plurality of PSI filters for handling a particular message stream. In this regard, the output generated from each of the plurality of filters may be transferred to a plurality of processes having an interest in the filtered data. Accordingly, other filters may remain operational and in use while a particular filter is being updated. The message stream may be any packetized message stream, for example, an MPEG message stream.

The DMA controller block 214 may be a standardized DMA controller, which may be utilized to control direct memory transfer of filtered data to a memory such as the memory 222 in the host 202.

The PSI parser block 210 may comprise suitable logic, circuitry and/or code that may be utilized to parse an incoming transport stream. Accordingly, various portions of an incoming data stream may be parsed and only the required portions of the parsed data stream are filtered by the PSI filter 216. The PSI parser block 210 may parse the incoming data stream allowing, for example, the payload portion of the incoming data stream to be filtered by the PSI filter block 216.

The system of FIG. 2 may be implemented in hardware and/or suitable software that may be utilized to control various aspects of the hardware processing. For example, the software may be utilized to control hardware in order to ensure that a filter for a particular PSI message is not updated until the message is received. Accordingly, the software may ensure that a filter is not updated during the middle of receipt of a PSI message. In one aspect of the invention, the update and setup of the filters may be handled in software. Filtering and routing of filtered information may be more efficiently handled in hardware to accommodate faster operational speeds in line with the data rate of the incoming transport stream. Notwithstanding, the invention may not be so limited.

Although the various functions 224 for dynamically updating message filter coefficients are illustrated separately in FIG. 2, the invention is not limited in this regard. Accordingly, it should be realized that one or more of the functional blocks may be combined without departing from the various aspects of the invention. For example, functions performed by the filter change in progress block 204 may be combined with the filter change status block 206 and vice versa. In this regard, a single processing block having combined filter change in progress and filter change status may replace the filter change in progress block 204 and the filter change status block 206.

With reference to FIG. 2, the system for processing packets in a data stream may comprise a PSI filter 216 that is selected to filter data in a first portion of an incoming data stream.

Filter change logic 212 may determine whether the selected filter is in use at initiation of a new modification process. The processor 220 may invalidate any data that may be read when the selected filter is in use or being updated. The filter change in progress process 204 may be utilized to indicate that there is no match for the selected filter in instances where the selected filter is in use. The filter change status process 206 may be adapted to mark the selected filter as being in use prior to updating the selected filter. One or more configuration table(s) 228 comprising configuration data may be utilized to update filter coefficients for the selected filter while the selected filter is marked as being in use. In this regard, the filter configuration table(s) 228 may be utilized to dynamically configure the selected filter to filter desired PSI data. The filter change status process 206 may also mark the selected filter as not being in use once updating of the PSI filter has been completed.

The processor 220 may be adapted to utilize newly declared valid filters at the beginning of a new message in the incoming data stream. The processor 220 may also be configured to discard corresponding data handled by the selected filter if the selected filter is marked as being in use or is being updated. The PSI parser 210 may parse the incoming data stream prior to filtering by the PSI filter 216. A second filter that is marked as not being in use by the processor 220, may be utilized to filter at least a second portion of the selected incoming data stream while the selected filter is in use. Accordingly, if one filter is marked as being in use or being updated by the processor 220, then the processor may utilize other filters for filtering the incoming data stream. The filter change in status process 206 may be adapted to determine and indicate when a change in status of the selected filter occurs.

Although the invention is described with respect to MPEG packets, the invention is not limited in this regard. The method and system for changing filter coefficients may be utilized in any message system, including messaging systems that utilize program specific information messages or other similar type packetized data.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing packets in a data stream, the method comprising:
   selecting a filter for filtering data in a first portion of an incoming data stream;
   at initiation of a new modification process, determining whether said selected filter is in use; and
   if said selected filter is in use, invalidating data read through use of said selected filter.

2. The method according to claim 1, comprising if said selected filter is in use, indicating that there is no match for said selected filter.

3. The method according to claim 1, comprising marking said selected filter as being in use prior to updating said selected filter.

4. The method according to claim 3, comprising updating filter coefficients for said selected filter while said filter is marked as being in use.

5. The method according to claim 4, comprising marking said selected filter as not being in use upon completion of said updating.

6. The method according to claim 5, comprising, if said selected filter is a newly declared valid filter, utilizing said newly declared valid filter at a beginning of a new message in said incoming data stream.

7. The method according to claim 1, comprising, if said selected filter is in use, ignoring corresponding data handled by said selected filter.

8. The method according to claim 1, comprising parsing said incoming data stream.

9. The method according to claim 1, comprising dynamically configuring said selected filter based on data stored in a filter configuration table.

10. The method according to claim 4, comprising, if said selected filter is in use, filtering at least a second portion of said selected incoming data stream if a corresponding filter configured for said filtering of said at least a second portion of said incoming data stream is not marked as being in use.

11. The method according to claim 1, comprising determining when a change in status of said selected filter occurs.

12. The method according to claim 11, comprising indicating when said change in said status of said selected filter occurs.

13. A machine-readable storage having stored thereon, a computer program having at least one code section for processing packets in a data stream, the at least one code section being executable by a machine for causing the machine to perform steps comprising:
   selecting a filter for filtering data in a first portion of an incoming data stream;
   at initiation of a new modification process, determining whether said selected filter is in use; and
   invalidating data read through use of said selected filter, if said selected filter is in use.

14. The machine-readable storage according to claim 13, comprising code for indicating that there is no match for said selected filter, if said filter is in use.

15. The machine-readable storage according to claim 13, comprising code for marking said selected filter as being in use prior to updating said selected filter.

16. The machine-readable storage according to claim 15, comprising code for updating filter coefficients for said selected filter while said filter is marked as being in use.

17. The machine-readable storage according to claim 16, comprising code for marking said selected filter as not being in use upon completion of said updating.

18. The machine-readable storage according to claim 17, comprising code for utilizing said newly declared valid filter at a beginning of a new message in said incoming data stream, if said selected filter is a newly declared valid filter.

19. The machine-readable storage according to claim 13, comprising code for ignoring corresponding data handled by said selected filter, if said selected filter is in use.

20. The machine-readable storage according to claim 13, comprising code for parsing said incoming data stream.

21. The machine-readable storage according to claim 13, comprising code for dynamically configuring said selected filter based on data stored in a filter configuration table.

22. The machine-readable storage according to claim 12, comprising code for filtering at least a second portion of said selected incoming data stream if a corresponding filter configured for said filtering of said at least a second portion of said incoming data stream is not marked as being in use, if said selected filter is in use.

23. The machine-readable storage according to claim 13, comprising code for determining when a change in status of said selected filter occurs.

24. The machine-readable storage according to claim 23, comprising code for indicating when said change in said status of said selected filter occurs.

25. A system for processing packets in a data stream, the system comprising:
a PSI filter that is selected to filter data in a first portion of an incoming data stream;
filter change logic that determines whether said selected filter is in use at initiation of a new modification process; and
a processor that invalidates data read through use of said selected filter if said selected filter is in use.

26. The system according to claim 25, comprising a filter change in progress process utilized to indicate that there is no match for said selected filter if said selected filter is in use.

27. The system according to claim 26, comprising a filter change status process that marks said selected filter as being in use prior to updating said selected filter.

28. The system according to claim 27, comprising at least one configuration table comprising data that is utilized to update filter coefficients for said selected filter while said selected filter is marked as being in use.

29. The system according to claim 28, wherein said filter change status process marks said selected filter as not being in use upon completion of said updating.

30. The system according to claim 29, comprising a newly declared valid filter which is utilized at a beginning of a new message in said incoming data stream.

31. The system according to claim 25, wherein said processor discards corresponding data handled by said selected filter if said selected filter is in use.

32. The system according to claim 25, comprising a PSI parser that parses said incoming data stream.

33. The system according to claim 25, comprising at least one filter configuration table that is utilized to dynamically configure said selected filter.

34. The system according to claim 25, comprising a second filter that is marked as not being in use, which filters at least a second portion of said selected incoming data stream while said selected filter is in use.

35. The system according to claim 25, comprising a filter change in status process that determines when a change in status of said selected filter occurs.

36. The system according to claim 35, comprising a filter change in progress status that indicates when said change in said status of said selected filter occurs.

37. A system for processing packets in a data stream, the system comprising:
a processor that selects a filter for filtering data in a first portion of an incoming data stream;
said processor determines whether said selected filter is in use, at initiation of a new modification process; and
said processor invalidates data read through use of said selected filter, if said selected filter is in use.

38. The system according to claim 37, wherein said processor indicates that there is no match for said selected filter, if said filter is in use.

39. The system according to claim 38, wherein said processor marks said selected filter as being in use prior to updating said selected filter.

40. The system according to claim 39, wherein said processor updates filter coefficients for said selected filter while said filter is marked as being in use.

41. The system according to claim 40, wherein said processor marks said selected filter as not being in use upon completion of said updating.

42. The system according to claim 41, wherein said processor utilizes a newly declared valid filter at a beginning of a new message in said incoming data stream.

43. The system according to claim 37, wherein said processor discards corresponding data handled by said selected filter, if said selected filter is in use.

44. The system according to claim 37, comprising a PSI parser that parses said incoming data stream.

45. The system according to claim 37, wherein said processor dynamically configures said selected filter based on data stored in a filter configuration table.

46. The system according to claim 37, wherein said processor utilizes a second filter that is not marked as being in use to filter at least a second portion of said selected incoming data stream, if said selected filter is in use.

47. The system according to claim 37, wherein said processor determines when a change in status of said selected filter occurs.

48. The system according to claim 47, wherein said processor indicates when said change in said status of said selected filter occurs.

* * * * *